United States Patent [19]
Paisley et al.

[11] 3,784,434
[45] Jan. 8, 1974

[54] METHOD OF LAMINATING PACKAGING FILM

[75] Inventors: George C. Paisley, Millbrae; Fred G. Tier, Sunnyvale, both of Calif.

[73] Assignee: Milprint, Inc., Milwaukee, Wis.

[22] Filed: Mar. 8, 1971

[21] Appl. No.: 122,205

Related U.S. Application Data

[63] Continuation of Ser. No. 717,844, March 1, 1968, abandoned.

[52] U.S. Cl............... 156/280, 156/244, 156/308, 156/314, 156/331, 161/190, 161/227, 161/249, 161/254, 161/256
[51] Int. Cl............. B32b 31/06, B32b 31/12
[58] Field of Search................. 161/254, 249; 156/308, 314, 331, 280, 244, 249, 254, 256, 190, 227

[56] References Cited
UNITED STATES PATENTS
3,037,868 6/1962 Rosser ........................... 161/249
3,445,324 5/1969 Curler et al.................... 161/254

Primary Examiner—Clifton B. Cosby
Attorney—Donald G. Casser

[57] ABSTRACT

A multiple layer laminated packaging film incorporating cellophane coated on only one side with a heat sealable coating, heat sealable polyethylene applied to the uncoated side of the cellophane, and a polypropylene exterior layer joined to the coated side of the cellophane by means of a heat sealable coating on the inner surface of the polypropylene.

1 Claim, 1 Drawing Figure

PATENTED JAN 8 1974
3,784,434
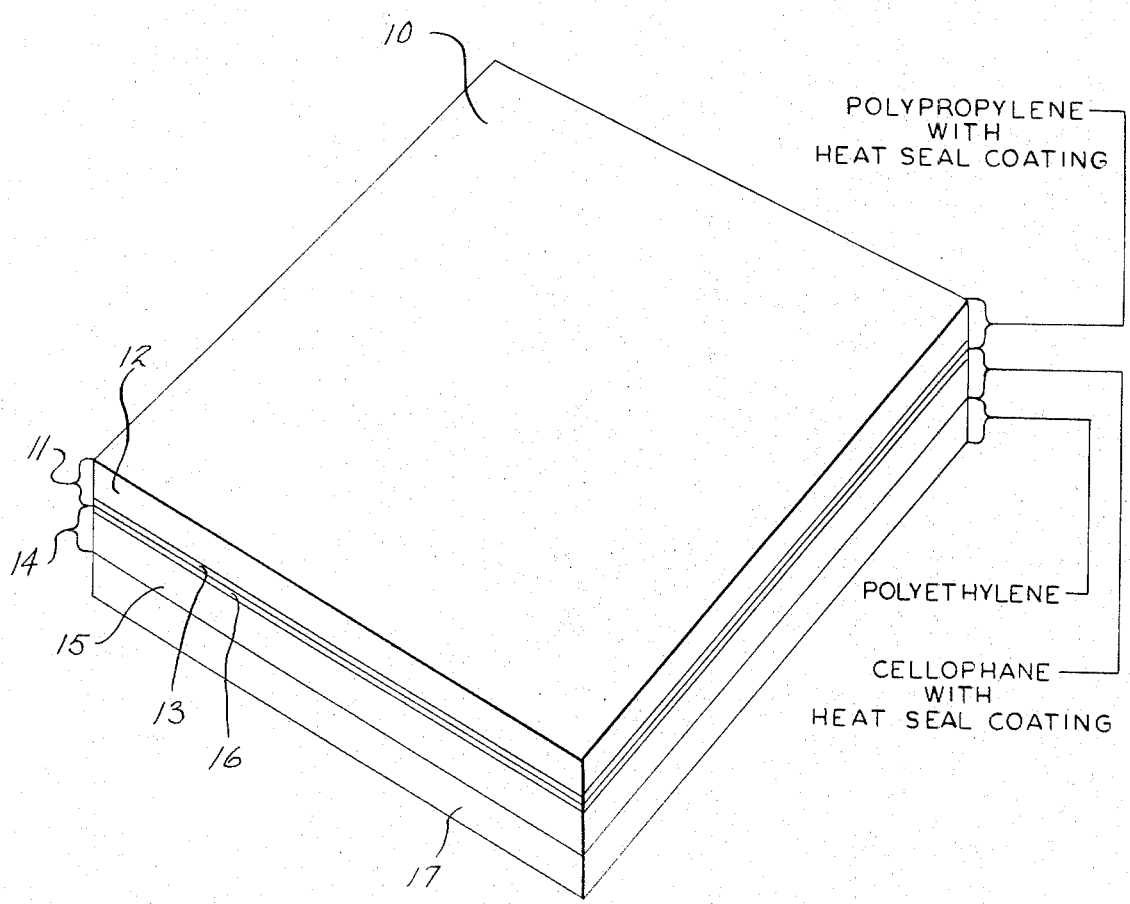
INVENTORS
FRED G. TIER
GEORGE C. PAISLEY
BY [signature]
ATTORNEY

METHOD OF LAMINATING PACKAGING FILM

This application is a continuation of Ser. No. 717,844, filed Mar. 1, 1968, now abandoned.

BACKGROUND OF THE INVENTION

1. Field

The field of the present invention is the art of packaging films, more specifically multiple layer laminated films which can be wrapped around an object to be packaged or converted into containers such as bags or pouches in which articles can be inserted.

2. Prior Art

Laminated films incorporating saran coated cellophane, polyethylene and polypropylene are known in the prior art. An example of one known construction of this general class is shown in U. S. Pat. No. 3,274,004 in which a polypropylene first layer is joined to a polyethylene second layer which in turn is joined to a cellophane third layer coated on both sides with saran and then a polyethylene fourth layer is joined to the opposite side of the double coated cellophane layer. The film thus involves four film layers and two layers of saran coating, which is a large number of layers and can increase the expense of its manufacture, and the cellophane layer is coated on both sides with a barrier material, i.e., the saran coatings, thereby preventing the cellophane layer from being moisturized during the process of manufacturing the film.

SUMMARY OF THE INVENTION

The present invention simplifies the mechanical construction of a multiple layer film laminated packaging film incorporating coated cellophane, polypropylene and polyethylene. In the film construction of this invention, a polypropylene first layer is joined to a cellophane second layer that is coated on only one side with saran, the polypropylene being joined to the saran coated side of the cellophane through the use of a heat seal coating on the polypropylene, and a polyethylene layer is joined to the uncoated surface of the cellophane.

From the foregoing description of the films of this invention, it can be seen that several layers have been eliminated as compared to the prior art film mentioned above. The present construction involving a reduced number of layers is believed to provide a packaging film which is less stiff than the prior art film, thereby imparting greater "machineability" to the finished film, by which is meant that it is easier to employ the film on a packaging machine which may form or wrap the film about an article to be packaged. Further, the decrease in the number of layers improves the ability of the laminated film to form around a product being packaged on automatic packaging machinery, thereby providing a more tightly-conforming package.

Secondly, incorporation of a cellophane layer having a saran coating on only one of its surfaces as compared to a cellophane layer having a saran coating on both of its surfaces as in the above prior art film leads to a very important advantage. Because the cellophane layer is first joined to the polypropylene layer along its saran coating, its opposite surface is left exposed after the lamination has taken place and before the inner polyethylene layer is joined to the uncoated surface of the cellophane. This allows the film laminator to apply moisture to the hydrophilic cellophane layer, thereby enabling him to increase its moisture content. Because the plasticity of the cellophane (regenerated cellulose) is proportional to its moisture content, this greatly increases the softness and pliability of the laminated film material. In the prior art film mentioned above, since the cellophane is coated on both sides with saran, there is no opportunity to apply moisture to the hydrophilic cellophane layer because the saran is a barrier coating for water or water vapor.

As another feature of the present invention, the heat sealable coating on the polypropylene and the heat sealable coating on the cellophane are both to have a relatively low sealing temperature range on the order of 180°F to 250°F in order that joinder of the polypropylene to the cellophane layer can be accomplished with a minimum risk of thermal damage to either the cellophane or the polypropylene. This is in contrast to some prior art films wherein polypropylene is joined to coated cellophane by means of a layer of molten polyethylene that has been extruded at a temperature around 600°F. This is an especially important feature because it reduces wrinkling or curling of the polypropylene which, in most applications of the present film, will form the exterior layer of a wrapped article. If the polypropylene is an oriented film, the low heat sealing temperature will also lessen any potential adverse effects of heat thereupon.

The laminated packaging films of this invention are useful in any of the normal packaging applications, such as for packaging food items or non-food items; however, it has proved effective as a wrapping material for cheese, particularly where it is wrapped about cheese in a form-and-fill package that is filled or flushed with an inert gas before the wrapper is completely sealed.

DESCRIPTION OF THE DRAWING

The ensuing description teaches the principles of the present invention by means of an illustrative embodiment and a discussion of some possible variations; the description is made with reference to the accompanying drawing which shows a perspective view, on an enlarged scale, of a sheet of laminated packaging film made according to the present invention.

DESCRIPTION OF THE PREFERRED EMBODIMENTS

The drawing illustrates one film of the present invention, and depicts a sheet 10 of wrapping material having the following construction:

1. A first layer 11 of heat-seal coated polypropylene consisting of a polypropylene substrate film 12 having a heat sealable coating 13 on one of its surfaces, the heat sealable coating 13 being applied to the polypropylene substrate before the layer 11 is laminated to the other layers of the sheet 10;

2. A second layer 14 comprising a layer of cellophane film 15 coated on only one of its surfaces with a heat sealable coating 16 in which the heat sealable coating 16 is applied to the cellophane substrate 15 before the second layer is joined with the other layers of the sheet 10; and 3. A third layer 17 of polyethylene which is applied to the uncoated surface of the second layer 14, i.e., to the uncoated surface of the cellophane layer 15 opposite from its surface carrying the heat sealable coating 16.

The coatings 13 and 16 should be heat sealable within a temperature range of 180°F–250°F, within which broad range 190°F–210°F is especially effective; they may be either the same or different compositions provided that they are compatible with each other if they have dissimilar compositions.

In manufacturing a sheet 10 of laminated packaging film, the heat seal coated polypropylene first layer 11 is first laminated to the heat seal coated second layer 14 of cellophane with the heat seal coating 12 on the first layer contacting the heat seal coating 16 on the second layer; upon completion of this first laminating step, the uncoated surface of the cellophane layer 14 remains exposed. This enables moisture, most usefully in the form of steam applied by any suitable means with an attachment to the laminating apparatus, to be applied to the cellophane layer through its exposed uncoated surface. Thereafter, the polyethylene third layer 17 is applied to the uncoated surface of the cellophane second layer 14, in which the polyethylene may be applied by extrusion coating or laminating a preformed film of polyethylene; suitable adhesion promoting primer coatings as are well known in the converting art (e.g., polyalkylene imines such as polyethylene imine) may be applied to the exposed cellophane surface after it has been moisturized in order to enhance the bond of the polyethylene to the cellophane. Thereafter the completed material is aged as necessary to increase adhesion of the polyethylene to the cellophane.

The following specific examples will further elucidate the nature of the present invention.

EXAMPLE 1

A sheet of 60 gauge biaxially oriented polypropylene coated on one side with a heat sealable coating comprising essentially saran polymer was passed through an oven at a temperature of 160°F–180°F to preheat the film. The film was then advanced to a nip roll assembly and there combined with a sheet of 250 RSO cellophane having a heat sealable coating comprising saran polymer on one of its surfaces. At the nip roll assembly, the sheet of polypropylene was backed up on its uncoated side with a rubber covered roll and the cellophane sheet was backed up on its uncoated side with a steam heated metal roll having a surface temperature of 190°F–200°F, and the polypropylene and cellophane sheets were laminated together under sufficient pressure with the saran coated surface of the polypropylen in contact with the saran coated surface of the cellophane so that the two fused together to form a firm bond. This laminated assembly was then led to an extrusion coater for the application of the polyethylene third layer, but prior to such application steam was applied to the exposed uncoated surface of the cellophane layer by passing the web about 3 to 6 inches from a drilled pipe that uniformly metered steam onto the web. After the application of steam, a polyethylene-adhesion promoting primer comprising a polyester-polyurethane admixture was applied at a rate of about 0.5 to 0.7 pounds per ream (3,000 square feet). The primer was dried, ahd heat sealable polyethylene was then extrusion coated onto the primed but otherwise uncoated surface of the cellophane at a weight of 28.8 pounds of polyethylene per ream. The material was then rewound and aged for 48 hours to allow full development of the maximum adhesion of the polyethylene to the cellophane surface.

Film according to Example 1 was used to package cheese on a commercial form-and-fill type of packaging apparatus (a Hayssen model RT machine). It was found that the film exhibited excellent machineability in that it was very flexible and provided a wrapper that tightly conformed to the exterior of the packaged cheese. In comparison to a prior art film laminate including (1) polypropylene, (2) polyethylene, (3) two side coated cellophane, and (4) polyethylene joined together in the enumerated sequence, the film of Example 1 was markedly less stiff and more readily conformed to the product when an internal partial vacuum was formed within the package. Furthermore, shipping tests were performed with packaged samples using both films in which the packages were trucked over a trip of several hunderd miles; it was found that cheese packaged in the film of Example 1 exhibited a substantially and significantly lower number of leaking packages (that is, packages that had lost the internal partial vacuum therewithin) than cheese packages utilizing the prior art film mentioned above.

EXAMPLE 2

Another film according to this invention was manufactured starting with an uncoated sheet of 50 gauge biaxially oriented polypropylene. The uncoated polypropylene film was in-line coated on the laminating apparatus as described in Example 1 with a saran polymer heat sealable coating, heat sealable within the range of 188°F to 250°F; the coating comprised a mixture of about 15 parts saran, 14 parts polyester, 8 parts polyurethane and methyl ethyl ketone and ethyl acetate, with less than 1 part carnauba wax. The coating was dried and thereafter the saran coated polypropylene film was joined to the saran coating of one-side saran coated cellophane using the process described above under Example 1. Combination of the coated polypropylene film to the coated cellophane film was accomplished with a temperature of 190°F at a rate of 250 feet of film per minute. The film of Example 2 also proved to be a highly satisfactory packaging film, exhibiting properties similar to the film of Example 1.

EXAMPLE 3

Using the methods described in Example 1, another satisfactory laminated packaging film was manufactured using the same one-side saran coated polypropylene and the one-side saran coated cellophane but with the polyethylene third layer applied at a coating weight of 36 pounds per ream of base film. The film was tested for its physical properties and found to exhibit excellent tensile strength, a broad range of heat sealing temperatures and also formed excellent packages on a form-and-fill type of packaging machine.

As mentioned in the preceding description, the first layer of the multiple layer packaging film of this invention is to comprise a film of propylene polymer. The term "propylene polymer" as used herein refers to homopolymers of propylene, interpolymers of propylene with other copolymerizable alpha olefins such as ethylene, butene-1, etc., containing at least 50 percent propylene, or blends containing major amounts of the foregoing propylene homopolymers or interpolymers and other polymeric or resinous ingredients. For most packaging uses, the first layer may be from 50 to 110 gauge, that is 0.0005 inches to 0.0011 inches, thick and it may be un-oriented, uniaxially oriented or biaxially oriented.

The second layer of the composite films is to include a cellophane base film, the term cellophane being used herein to refer to films derived from regenerated cellulose and cellulose ethers. The regenerated cellulose films may be prepared by the well-known viscose process, from cuprammonium solutions, or by regenerating cellulose from cellulose ethers or esters. Cellulose ethers which may be used as a base sheet include hydroxyalkyl ethers, particularly hydroxy ethyl cellulose; alkyl ethers such as methyl and ethyl cellulose; and carboxyalkyl ethers such as carboxymethyl cellulose. For most packaging purposes, the cellophane second layer may be from 140 to 250 yield (i.e., 14,000 to 25,000 square inches/pound).

The heat sealable coatings on the one surface of the cellophane second layer and, in a presently-preferred form, the heat sealable coating on the propylene first layer may both comprise a coating of saran polymer. The term "saran polymer" is defined herein as homopolymers and interpolymers of vinylidene chloride having high impermeability to vapors, the commercial sarans generally comprise a binary or ternary interpolymer having 50 percent or more vinylidene chloride and the balance two or more copolymerizable monomers such as vinyl chloride, alkyl methacrylates and acrylates, acrylonitrile, and acrylic acid or methacrylic acid. Other saran interpolymers of vinylidene chloride may also be employed, particularly those containing at least 25 weight percent of vinylidene chloride in the polymerized molecule and the balance one or more other monoethylenically unsaturated monomers that are copolymerizable with vinylidene chloride.

The third layer of the composite films of this invention is to comprise a heat sealable layer of ethylene polymer. Most generally, this can be a low density branched chain polyethylene, but in other instances a medium density polyethylene may also be employed depending on whether the heat sealing temperature range is suitable for the intended application. Polyethylene with a density of 0.918 to 0.926 and a melt index of 1.0 to 15.0 applied at a weight of 14.4 to 45.0 lbs/ream (3,000 square feet) of cellophane is effective for the purposes of this invention. When wrapped about a package, seals may be formed between contacting portions of polyethylene third layers or between the polyethylene third layer and another film or layer of the composite film.

"Heat sealing" as used herein refers to the characteristic of softening or fusing to form a satisfactory bond between contacting portions of material upon the momentary application of heat and pressure. The temperatures employed are above the softening temperature of the film or coating being heat sealed, the pressures may vary between less than 1 pound to 50 pounds per square inch, and the "dwell time" during which the contacting material is subjected to the heat and pressure is normally from a fraction of a second to several seconds.

It is to be understood that it is intended to cover all changes and modifications of the examples of this invention herein disclosed, as well as other embodiments not disclosed, which do not constitute a departure from the true spirit and scope of this invention.

We claim:

1. A method for the manufacture of a flexible packaging film comprising the steps of:
   1. providing a first layer consisting essentially of a film of propylene polymer and a heat sealable saran polymer coating on a surface of the film, said coating being heat sealable within a temperature range of about 180°–250°F;
   2. providing a second layer consisting of a film of cellophane and a heat sealable saran polymer coating on only a first surface of the film, said coating being heat sealable within a temperature range of about 180°–250°F, and said cellophane having an uncoated second surface opposite the first surface;
   3. joining the first layer to the second layer by placing the heat sealable coating of the first layer into contact with the heat sealable coating of the second layer and applying heat to the uncoated second surface of the cellophane to cause the heat sealable saran polymer coating of the first layer to fuse with the heat sealable saran polymer coating of the second layer to thereby laminate the first layer to the second layer;
   4. moisturizing the cellophane by the application of water vapor through its uncoated second surface after the first layer has been joined to the second layer but before a third layer is joined to the second layer;
   5. coating said second surface of the cellophane with an adhesion promoting primer, and
   6. thereafter applying a third layer consisting of a heat sealable polyethylene over the entire second surface of the cellophane.

* * * * *